(12) United States Patent
Guo

(10) Patent No.: US 11,112,264 B2
(45) Date of Patent: Sep. 7, 2021

(54) SYSTEM AND METHOD FOR RENDERING AN OVERPASS OBJECT USING MAP AND LINK DATA

(71) Applicant: BEIJING DIDI INFINITY TECHNOLOGY AND DEVELOPMENT CO., LTD., Beijing (CN)

(72) Inventor: Zhirui Guo, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/094,852

(22) Filed: Nov. 11, 2020

(65) Prior Publication Data

US 2021/0063186 A1 Mar. 4, 2021

Related U.S. Application Data

(63) Continuation of application No. PCT/CN2018/125842, filed on Dec. 29, 2018.

(30) Foreign Application Priority Data

Dec. 28, 2018 (CN) .......................... 201811619028.8

(51) Int. Cl.
*G01C 21/36* (2006.01)
*G06T 11/20* (2006.01)
(Continued)

(52) U.S. Cl.
CPC ........... *G01C 21/367* (2013.01); *G06F 16/29* (2019.01); *G06T 11/203* (2013.01); *G06T 17/05* (2013.01);
(Continued)

(58) Field of Classification Search
CPC ... G06T 17/05; G06T 11/203; G06T 2210/21; G06T 2210/61; G01C 21/367; G01C 21/3815; G06F 16/29
See application file for complete search history.

(56) References Cited

U.S. PATENT DOCUMENTS 5,367,617 A * 11/1994 Goossen ............... G06T 11/203
345/442
6,208,934 B1 * 3/2001 Bechtolsheim .... G01C 21/3688
701/428
(Continued)

FOREIGN PATENT DOCUMENTS

| CN | 105976698 A | 9/2016 |
| CN | 106780736 A | 5/2017 |
| CN | 106959974 A | 7/2017 |

OTHER PUBLICATIONS

Bin Zhao, A Study of the Navigable Date Producing System and Its Key Techniques, PhD Thesis of The PLA Information Engineering University, 2006, 131 pages.
(Continued)

*Primary Examiner* — Daniel F Hajnik
(74) *Attorney, Agent, or Firm* — Metis IP LLC

(57) ABSTRACT

A method for rendering an object is provided. The method may include obtaining tile information associated with a region of interest (ROI) from a database. The method may include extracting, from the tile information, one or more links along a center line of an overpass in the ROI. The method may include determining at least one intersection of the one or more links. The method may include performing a topology analysis on the one or more links and the at least one intersection to generate a link chain of the one or more links. The method may include constructing a model of the
(Continued)

overpass based on the link chain of the one or more links. The method may further include rendering the model of the overpass.

18 Claims, 13 Drawing Sheets

(51) Int. Cl.
 *G06F 16/29* (2019.01)
 *G06T 17/05* (2011.01)
(52) U.S. Cl.
 CPC ...... *G06T 2210/21* (2013.01); *G06T 2210/61* (2013.01)

(56) References Cited

U.S. PATENT DOCUMENTS

| | | | |
|---|---|---|---|
| 9,909,894 B2 | 3/2018 | Kim et al. | |
| 2002/0070934 A1* | 6/2002 | Sakamoto | G08G 1/0969 345/419 |
| 2011/0160987 A1 | 6/2011 | Wu et al. | |
| 2013/0328924 A1* | 12/2013 | Arikan | G01C 21/32 345/629 |
| 2014/0267279 A1* | 9/2014 | Kontkanen | G06T 17/05 345/427 |
| 2014/0362082 A1 | 12/2014 | Schpok et al. | |

OTHER PUBLICATIONS

"Create Overpass", Web page <https://desktop.arcgis.com/en/arcmap/latest/tools/cartography-toolbox/create-overpass.htm>, retrieved in 2018.

Yuling Bi, The Study and Experiment for Expression Method of 3D Geographic Information Symbolization, Master's Thesis of Chinese Academy of Surveying and Mapping, 2014, 72 pages.

International Search Report in PCT/CN2018/125842 dated Sep. 27, 2019, 4 pages.

Written Opinion in PCT/CN2018/125842 dated Sep. 27, 2019, 5 pages.

* cited by examiner

1300

SYSTEM AND METHOD FOR RENDERING AN OVERPASS OBJECT USING MAP AND LINK DATA

CROSS-REFERENCE TO RELATED APPLICATIONS

This application is a continuation of International Application NO. PCT/CN2018/125842, filed on Dec. 29, 2018, which claims priority of Chinese Patent Application No. 201811619028.8, filed on Dec. 28, 2018, the entire contents of each of which are hereby incorporated by reference.

TECHNICAL FIELD

The present disclosure generally relates to map services, and in particular, relates to systems and methods for rendering an object in a map.

BACKGROUND

A digital map may provide a great convenience for people's daily travel, which in general, may display road information, building information, and so on. However, on most digital maps, an overpass connecting to two sidewalks is displayed as an ordinary ground road in two dimensions, not in three dimensions. Thus, a user may fail to tell an overpass from the surrounding ordinary ground roads displayed on the most digital maps. In some occasions, this failure can lead to a great incontinence and even a traffic accident. Therefore, it is desirable to develop systems and methods for rendering an object accurately, which aims at providing object information (e.g., the road type—an overpass or an ordinary ground road) visually.

SUMMARY

According to an aspect of the present disclosure, a system is provided. The system may include at least one storage device including one or more sets of instructions, and at least one processor in communication with the at least one storage device. When executing the set of instructions, the at least one processor may obtain tile information associated with a region of interest (ROI) from a database. The at least one processor may extract, from the tile information, one or more links along a center line of an overpass in the ROI. The at least one processor may determine at least one intersection of the one or more links. The at least one processor may perform a topology analysis on the one or more links and the at least one intersection to generate a link chain of the one or more links. The at least one processor may construct a model of the overpass based on the link chain of the one or more links. The at least one processor may further render the model of the overpass.

In some embodiments, the at least one processor may construct one or more sub-models corresponding to a link type of the one or more links that have a same group-ID. The at least one processor may determine a sequence of fusion based on the link chain, and fuse the one or more sub-models according to the sequence of fusion.

In some embodiments, the one or more sub-models may include a flat board model and at least one side wall model. To construct the flat board model and the at least one side wall model corresponding to the one or more links, for each of the one or more links, the at least one processor may thicken the link in a width direction perpendicular to a main axis of the link to construct the flat board model. The at least one processor may extend, according to a first preset parameter, the flat board model in a direction perpendicular to a surface of the flat board model. The at least one processor may construct the at least one side wall model on at least one side of the flat board model.

In some embodiments, for each two of the one or more sub-models to be fused, the at least one processor may determine coordinates of points on the two sub-models. The at least one processor may determine at least one fusion point which two points of the two sub-models have the same coordinate at. The at least one processor may connect the two sub-models at the at least one fusion point. The at least one processor may further eliminate sections of the two sub-models beyond the at least one fusion point, if the one or two of the two sub-models are the at least one side wall models.

In some embodiments, the at least one processor may determine a main span link from the one or more links, and extend sections of a sub-model of the main span link that are connected to sub-models of other of the one or more links.

In some embodiments, the at least one processor may integrate the rendered model of the overpass into a 2D digital map associated with the ROI. The at least one processor may transmit the 2D digital map with the rendered overpass to a user device, and display the 2D digital map with the rendered overpass on the user device.

In some embodiments, the at least one processor may determine an edge on the model of the overpass, wherein the edge is bounded by a first surface and a second surface of the model of the overpass. The at least one processor may determine a curve corresponding to the edge from a first point on the first surface to a second point on the second surface. The at least one processor may determine at least one point on the curve. The at least one processor may replace the edge by at least two segments sequentially connecting the first point on the first surface, the at least one point on the curve, and the second point on the second surface.

In some embodiments, the at least one processor may generate a plurality of surface grids on a surface of the model of the overpass connecting the one or more links in a clockwise direction or anti-clockwise direction to form a circle. The at least one processor may render the plurality of surface grids.

In some embodiments, the at least one processor may determine a vertex in one or more surface grids of the plurality of surface grids, wherein the vertex is higher or lower than other vertices on the one or more surface grids. The at least one processor may adjust a height of the vertex based on the heights of the other vertices in the one or more surface grids.

In some embodiments, the at least one processor may render each of sections of the model based on the type of the links.

According to an aspect of the present disclosure, a method is provided. The method may be implemented on a computing device having at least one processor and at least one computer-readable storage medium. The at least one processor may obtain tile information associated with a region of interest (ROI) from a database. The at least one processor may extract, from the tile information, one or more links along a center line of an overpass in the ROI. The at least one processor may determine at least one intersection of the one or more links. The at least one processor may perform a topology analysis on the one or more links and the at least one intersection to generate a link chain of the one or more links. The at least one processor may construct a model of the overpass based on the link chain of the one or more links. The at least one processor may further render the model of the overpass.

According to another aspect of the present disclosure, a non-transitory computer readable medium is provided. The non-transitory computer readable medium may comprise at least one set of instructions. When executing the set of instructions, at least one processor may obtain tile information associated with a region of interest (ROI) from a database. The at least one processor may extract, from the tile information, one or more links along a center line of an overpass in the ROI. The at least one processor may determine at least one intersection of the one or more links. The at least one processor may perform a topology analysis on the one or more links and the at least one intersection to generate a link chain of the one or more links. The at least one processor may construct a model of the overpass based on the link chain of the one or more links. The at least one processor may further render the model of the overpass.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

It will be understood that the term "system," "module," and/or "block" used herein are one method to distinguish different components, elements, parts, section or assembly of different level in ascending order. However, the terms may be displaced by another expression if they achieve the same purpose.

Figure 2:
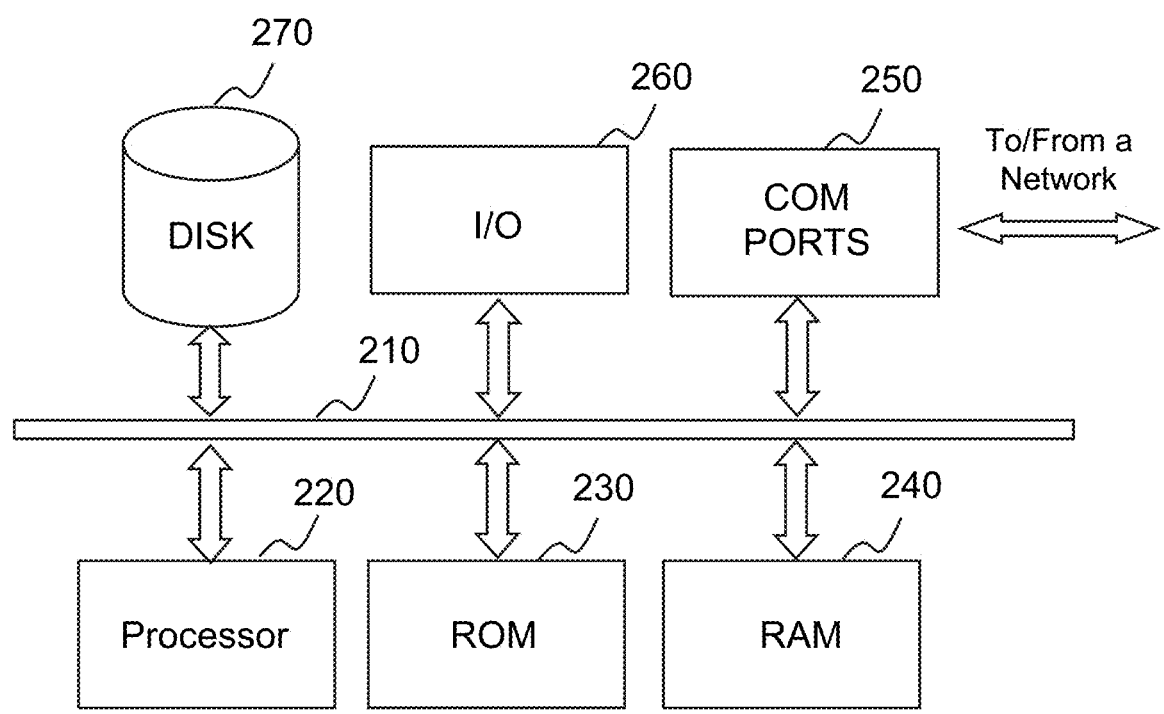
FIG. 2 is a block diagram illustrating an exemplary computing device configured to implement a specific system disclosed in the present disclosure.

The term "module," or "block," as used herein, refers to logic embodied in hardware or firmware, or to a collection of software instructions. A module or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., the processor 220 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an Electrically Programmable Read-Only-Memory (EPROM). It will be further appreciated that hardware modules/units/blocks may be included in connected logic components, such as gates and flip-flops, and/or can be included in programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a module or block is referred to as being "connected to," or "coupled to," another module, or block, it may be directly connected or coupled to, or communicate with the other module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Various embodiments of the present disclosure may be provided as a map rendering system configured to render a 3D overpass model on a 2D digital map, which helps a user to recognize the overpass connected two sidewalks or roads intuitively. In some embodiments, the system may obtain map tiles associated with a region of interest (ROI) in response to a request for map services. The system may extract one or more links of the overpass included in the ROI according to the map tiles. The system may further determine a link chain by performing a topology analysis on the one or more links. The link chain may indicate a spatial relationship of one or more structures of the overpass (e.g., a main span, one or more upward pavements). The system may construct the 3D overpass model based on the link chain. In some embodiments, the system may render the 3D overpass directly at a server side, and send the rendered 3D overpass to a device of the user. In some embodiments, the system may render the 3D overpass at a client side (e.g., the device of the user) for sharing processing load of the server.

Figure 1:
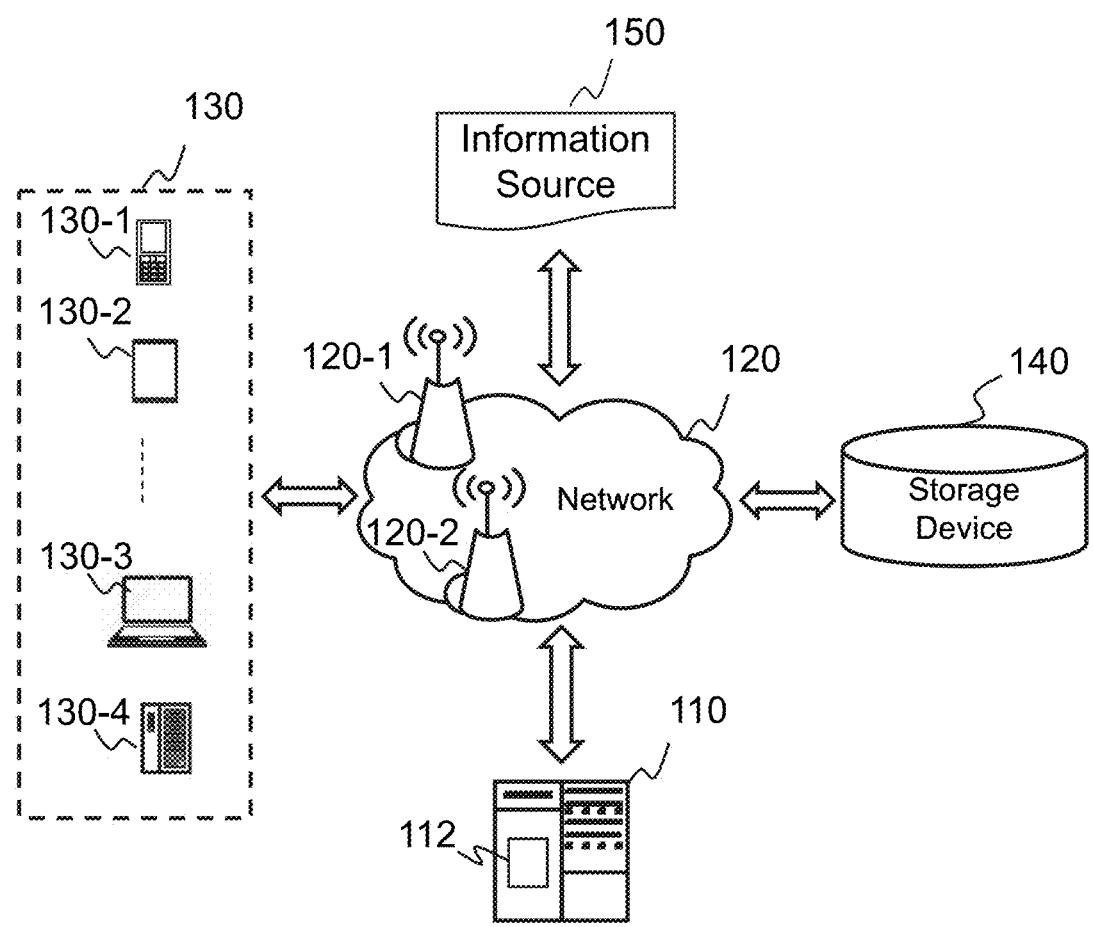
FIG. 1 is a schematic diagram illustrating an exemplary map rendering system according to some embodiments of the present disclosure.

FIG. 1 is a schematic diagram of an exemplary map rendering system according to some embodiments. For example, the map rendering system 100 may be any suitable online or offline service platform for providing transportation services (e.g., taxi hailing, chauffeur services, delivery services, carpool, bus services, take-out services, driver hiring, vehicle hiring, train services, subway services, shuttle services), shopping services, carryout services, navigation services, map services, or the like. In some embodiments, the map rendering system 100 may include a server 110, a network 120, one or more user terminals 130, a storage device 140, and an information source 150. It should be noted that the map rendering system 100 shown in FIG. 1 is merely an example, and not intended to be limiting.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the one or more user terminals 130, the storage device 140, and/or the information source 150 via the network 120. As another example, the server 110 may be directly connected to the one or more user terminals 130, the storage device 140, and/or the information source 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing device 112. The processing device 112 may process information and/or data related to one or more map services. In some embodiments, the processing device 112 may receive a request for map services, for example, a map navigation for walking, driving, or riding. The processing device 112 may generate the map in response to the request. For example, the processing device 112 may obtain one or more map tiles associated with a region of interest (ROI) from the information source 150. The ROI may include a building, a road, an overpass connected to two or more sidewalks, or the like, or any combination thereof. Given the ROI includes the overpass, the processing device 112 may render the overpass, and display the rendered overpass on a two-dimensional (2D) digital map, by processing the obtained map tiles. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the map rendering system 100 (e.g., the server 110, the one or more user terminals 130, the storage device 140, or the information source 150) may send information and/data to other component(s) in the map rendering system 100 via the network 120. For example, the server 110 may obtain/acquire a map service request from the user terminal 130 via the network 120. The server 110 may provide the map service for the user terminal 130 via the network 120. As another example, the server 110 may receive tile information related to the ROI (e.g., the overpass) from the information source 150 directly or via the network 120. As a further example, the server 110 may send rendered map data to the user terminal 130 for displaying the map via the network 120. In some embodiments, the network 120 may be any type of wired or wireless network, or any combination thereof. Merely by way of example, the network 120 may include a cable network, a wireline network, an optical fiber network, a telecommunications network, an intranet, an internet, a local area network (LAN), a wide area network (WAN), a wireless local area network (WLAN), a metropolitan area network (MAN), a wide area network (WAN), a public telephone switched network (PTSN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the map rendering system 100 may be connected to the network 120 to exchange data and/or information.

In some embodiments, the user terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the user terminal 130 may be a device with positioning technology for locating the position of the service requester and/or the user terminal 130.

In some embodiments, the user terminal 130 may obtain rendered map data from the server 110. The user terminal 130 may request or receive the rendered map data. The user terminal 130 may send the data to another software or hardware module on the user terminal 130 or to an external device or system. The user terminal 130 may render a map in two-dimensional (2D) or three-dimensional (3D) graphic representation. In some embodiments, the user terminal 130 may display a rendered map, more particularly, a 3D rendered overpass on the 2D map. In some embodiments, the user terminal 130 may allow a user to perform operates on the rendered map, for example, zoom-in operation or zoom-out operation. In some embodiments, the map with different levels of detail may be displayed on an interface of the user terminal 130.

The storage device 140 may store data and/or instructions. For example, the data may relate to map data, for example, satellite image data, remote sensing image data, road segment data, building data, land cover data, or the like, or any combination thereof. In some embodiments, the storage device 140 may store data obtained from the one or more user terminals 130. In some embodiments, the storage device 140 may store data and/or instructions that the server 110 may execute or use to perform exemplary methods described in the present disclosure. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 120 to communicate with one or more components in the map rendering system 100 (e.g., the server 110, the one or more user terminals 130, etc.). One or more components in the map rendering system 100 may access the data and/or instructions stored in the storage device 140 via the network 120. In some embodiments, the storage device 140 may be directly connected to or communicate with one or more components in the map rendering system 100 (e.g., the server 110, the one or more user terminals 130, etc.). In some embodiments, the storage device 140 may be part of the server 110.

The information source 150 may include a database that provides map data from a map server. The map data may be used to render for generating visual 2D or 3D map. In some embodiments, the digital map may use a vector data model and/or a raster data model to describe real objects (e.g., the building, the road, the overpass). The vector data model represents geography as collections of points, lines, and polygons. The raster data model represents geography as cell matrices that store numeric values. The raster data model is also referred to as the tile model. The raster data model may be generated by tile data indicative of the cell matrices associated with the geography. The map data may include data for constructing the vector data model and/or the raster data model. In some embodiments, the map data may include satellite image data, remote sensing image data, road segment data, building data, land cover data, or the like, or any combination thereof. In some embodiments, the map data may be in the form of tile data. The information source 150 may provide a plurality of map tiles to be rendered into a visual map. In some embodiments, the information source 150 may be integrated to the map rendering system 100. In some embodiments, the information source 150 may be an external database or system separate from the map rendering system 100. For example, the information source 150 is provided by a third party map business (e.g., Google Map, Bing Map, etc.).

FIG. 2 is a block diagram illustrating exemplary hardware and software components of a computing device on which the server 110, the one or more user terminals 130 may be implemented according to some embodiments of the present disclosure. The computing device 200 may be configured to perform one or more functions of the server 110, and/or the user terminal 130 disclosed in this disclosure. For example, the processing device 112 may be implemented on the computing device 200 and configured to perform functions of the processing device 112 disclosed in this disclosure.

The computing device 200 may be a general-purpose computer or a special purpose computer, both may be used to implement a map rendering system 100 for the present disclosure. The computing device 200 may be used to implement any component of the map rendering system 100 as described herein. For example, the processing device 112 may be implemented on the computing device 200, via its hardware, software program, firmware, or a combination thereof. Although only one such computer is shown, for convenience, the computer functions relating to the rendering as described herein may be implemented in a distributed fashion on a number of similar platforms to distribute the processing load.

The computing device 200, for example, may include COM ports 250 connected to and from a network connected thereto to facilitate data communications. The computing device 200 may also include a processor 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 may also include an I/O component 260, supporting input/output between the computer and other components therein. The computing device 200 may also receive programming and data via network communications.

The computing device 200 may also include a hard disk controller communicated with a hard disk, a keypad/keyboard controller communicated with a keypad/keyboard, a serial interface controller communicated with a serial peripheral equipment, a parallel interface controller communicated with a parallel peripheral equipment, a display controller communicated with a display, or the like, or any combination thereof.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 3:
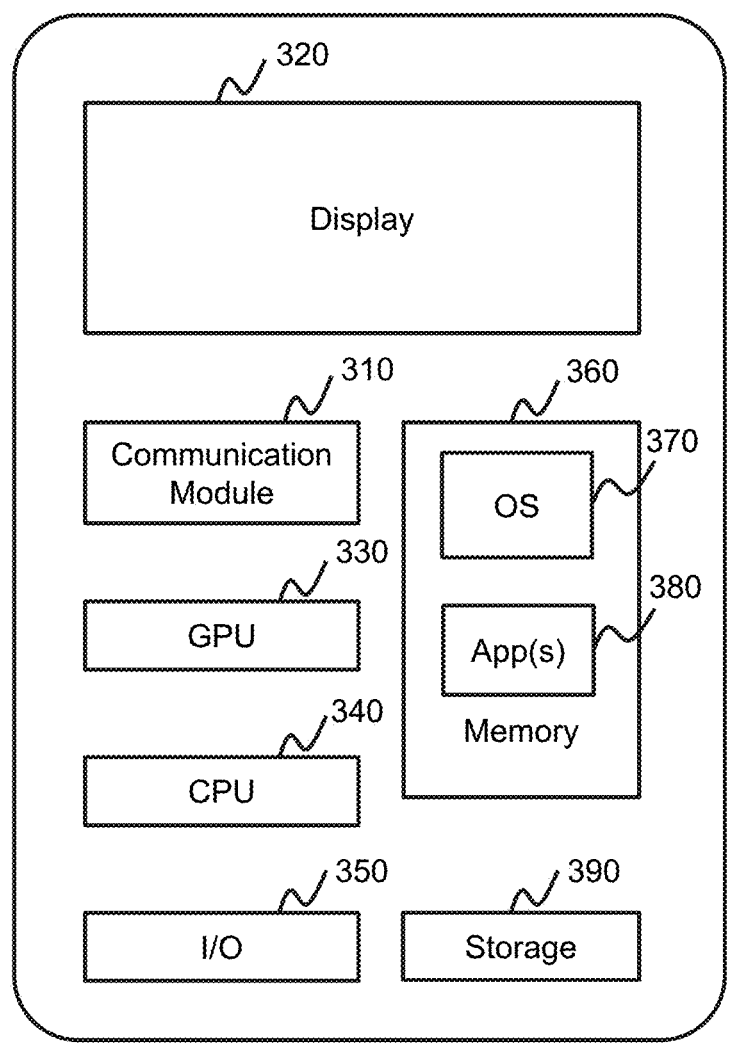
FIG. 3 is a block diagram illustrating an exemplary mobile device according to some embodiments of the present disclosure.

FIG. 3 is a block diagram of an exemplary mobile device configured to implement a specific system disclosed in the present disclosure. In some embodiments, a user terminal configured to display and communicate information related to the map rendering may be the mobile device 300. The mobile device 300 may include but is not limited to a smartphone, a tablet computer, a music player, a portable game console, a GPS receiver, a wearable calculating device (e.g. glasses, watches, etc.), or the like. The mobile device 300 may include one or more central processing units (CPUs) 340, one or more graphical processing units (GPUs) 330, a display 320, a memory 360, a communication module 310, a storage 390, and one or more input/output (I/O) devices 350. Moreover, the mobile device 300 may also be any other suitable component that includes but is not limited to a system bus or a controller (not shown in FIG. 3). As shown in FIG. 3, a mobile operating system 370 (e.g. 10S, Android, Windows Phone, etc.) and one or more applications 380 may be loaded from the storage 390 to the memory 360 and implemented by the CPUs 340. The application 380 may include a browser or other mobile applications configured to receive and process information related to a query (e.g., a name of a location) inputted by a user in the mobile device 300. The user may obtain information related to one or more search results through the system I/O device 350, and provide the information to the server 110 and/or other modules or units of the map rendering system 100 (e.g., the network 120).

In order to implement various modules, units and their functions described above, a computer hardware platform may be used as hardware platforms of one or more elements (e.g., the server 110 and/or other sections of the map rendering system 100 described in FIGS. 1-13). Since these hardware elements, operating systems and program languages are common, it may be assumed that persons skilled in the art may be familiar with these techniques and they may be able to provide information required in the map rendering according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the Figures.

Figure 4:
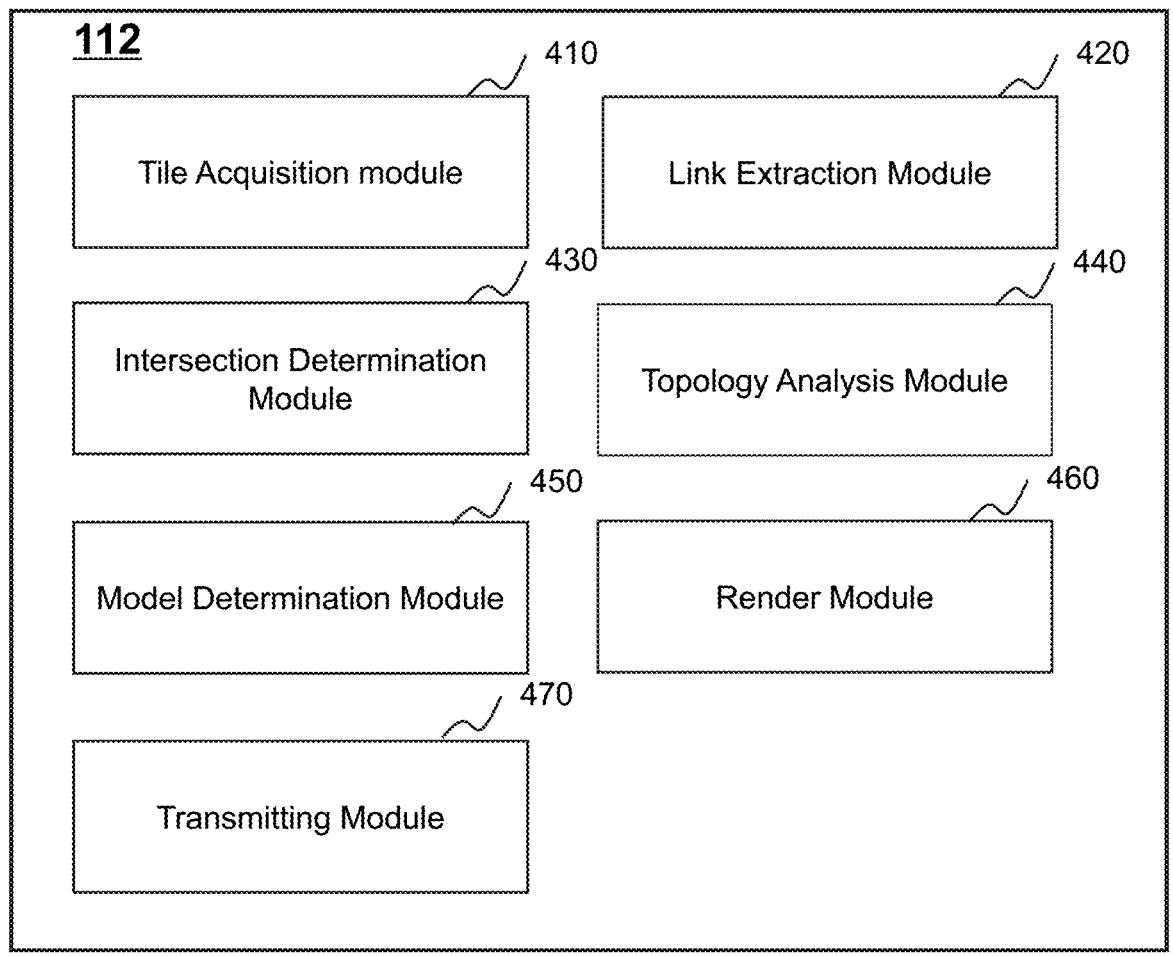
FIG. 4 is a block diagram illustrating an exemplary processing device according to some embodiments of the present disclosure.

FIG. 4 is a block diagram illustrating an exemplary processing device 112 according to some embodiments of the present disclosure. In some embodiments, the processing device 112 may be in communication with a computer-readable storage (e.g., the user terminal 130, the storage device 140, or the information source 150 etc.) and may execute instructions stored in the computer-readable storage medium. The processing device 112 may include a tile acquisition module 410, a link extraction module 420, an intersection determination module 430, a topology analysis module 440, a model determination module 450, a render module 460, and a transmitting module 470.

The tile acquisition module 410 may obtain tile information associated with a region of interest (ROI) from a database (e.g., the information source 150). In some embodiments, the ROI may include a specific region from a request, for example, a building, a bridge, a road segment, a route connected a start location to an end location, an overpass connected to two sidewalks or road segments, or the like, or any combination thereof. Map data associated with the ROI may be used to generate one or more map tiles, which produce the visual map. The map data may be in two dimensions or three dimensions. The map data may include but not limited to road segment data, land cover data, building data, streetscape data. The map tiles produced by the map data may include raster-based map tiles, and/or vector-based map tiles. In some embodiments, the map tiles at different levels of detail may depend on zoom levels. For different zoom levels, different number of map tiles associated with the ROI may be generated. The map tiles may be stored in a storage device (e.g., the storage device 140, or the information source 150). In response to a request, the tile acquisition module 410 may obtain one or more map tiles associated with the ROI.

The link extraction module 420 may extract one or more links along a center line of an overpass in the ROI from the tile information. In some embodiments, the link extraction module 420 may identify one or more tiles associated with the overpass in the ROI. The link extraction module 420 may extract the one or more links along the center line of the overpass based on the one or more tiles. In the field of geography, a center line of a road surface or a pavement of an overpass may be abstracted as a link. The link corresponds to the road surface or the pavement. The one or more links associated with the overpass may include one or more step links, one or more up links and at least one main span link. The link data may be included in the corresponding map tiles. For example, the link data may include but not limited to locations of the link, types of the link, and/or a group-ID corresponding to the link.

Figure 6:
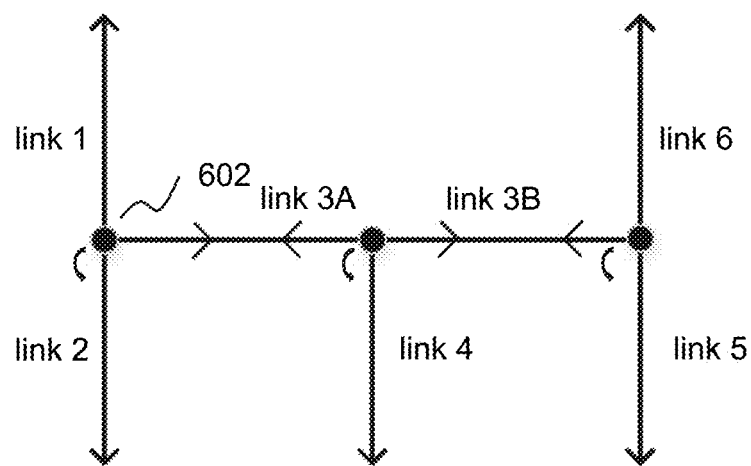
FIG. 6 is a schematic diagram illustrating exemplary link chain according to some embodiments of the present disclosure.

The intersection determination module 430 may determine at least one intersection of the one or more links. In some embodiments, when the end/start of a first link shares a location with the start of a second link, the shared location may be designated as the intersection. If there are at least one intersection between the one or more links, the one or more links may have at least one common attribute, for example, a name, a height, or a group-ID. The intersection determination module 430 may determine the at least one intersection by identifying the at least one common attribute. As shown in FIG. 6, link 1 and link 2 share a same start location, e.g., an intersection 602. The intersection determination module 430 may obtain data related to the intersection, such as an intersection ID, coordinates, intersection angle between two adjacent links, and so on.

The topology analysis module 440 may perform a topology analysis on the one or more links and the at least one intersection, to generate a link chain (e.g., the link chain 600 shown in FIG. 6) of the one or more links. In some embodiments, the link chain may include a network topology, which indicates a spatial relationship of the one or more links associated with the overpass. The link chain may be used to construct the overpass model including one or more sub-models.

The model determination module 450 may construct the overpass model based on the link chain of the one or more links. In some embodiments, the model determination module 450 may construct the one or more sub-models for each of the one or more links. The one or more links may have the same group-ID. The one or more sub-models may include a flat board model and at least one side wall model. In some embodiments, the model determination module 450 may determine the flat board model and the at least one sidewall model by performing process 800 illustrated in FIG. 8. In some embodiments, the model determination module 450 may further fuse the one or more sub-models according to a sequence of fusion. The model determination module 450 may determine the sequence of fusion (e.g., clockwise or counterclockwise) based on a setting of the map rendering system 100. More descriptions of the fusion of the one or more sub-models may be found elsewhere in the present disclosure (e.g., FIG. 7 and FIG. 10, and the descriptions).

Figure 11A:
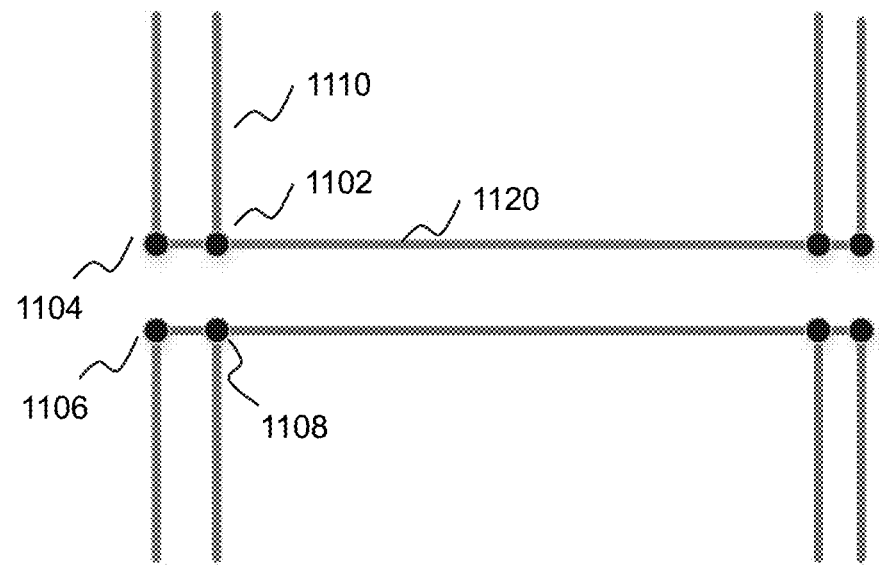
FIGS. 11A and 11B are schematic diagrams illustrating a top view of an overpass model according to some embodiments of the present disclosure.
Figure 11B:
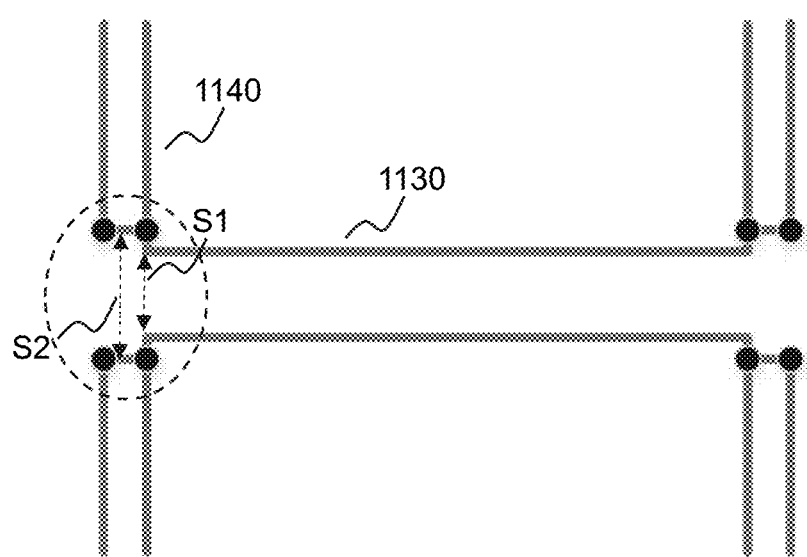

In some embodiments, during the construction of overpass model, the model determination module 450 may determine the main span link from the one or more links, and extend sections of a sub-model of the main span link that are connected to sub-models of other of the one or more links. The extended sections may include landing platforms, for example, as illustrated in FIG. 11B, in the dotted circle, the rectangular section surrounded by four points.

Figure 13:
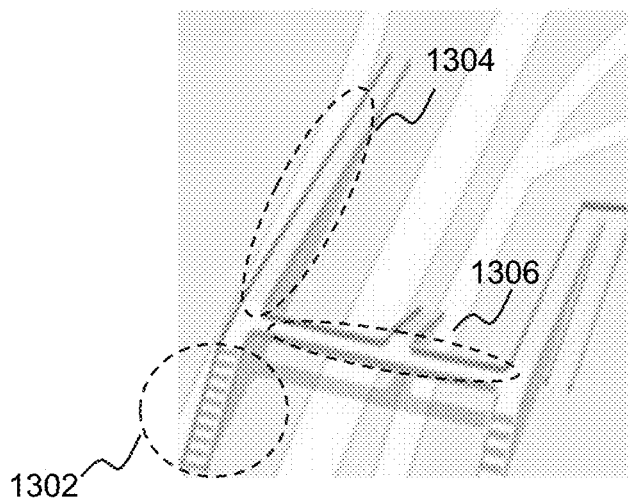
FIG. 13 is a schematic diagram illustrating a rendered overpass model displayed in 2D digital map according to some embodiments of the present disclosure.

The rendering module 460 may render the overpass model. As illustrated in FIG. 13, the overpass 1300 is rendered as a 3D model with one or more textures (e.g., shadows, steps, colors, etc.). In some embodiments, the rendering module 460 may generate a plurality of surface grids on a surface of the overpass model in a clockwise direction or anti-clockwise direction. Each of the plurality of surface grids may include a triangle, a square, a rectangle, a regular or irregular polygon, or the like, or any combination thereof. The rendering module 460 may render the plurality of surface grids of the overpass model based on texture data (e.g., color, shadow, etc.). The rendering module 460 may render the plurality of surface grids to present a visual 3D model of the overpass. In some embodiments, the rendering of the step link and the non-step link may be different. A user may tell the structures of overpass (e.g., the steps, the main span) easily based on the rendering.

The transmitting module 470 may integrate the rendered overpass model into a 2D digital map associated with the ROI. For example, the transmitting module 470 may compress and encode the rendered model, and send the 2D digital map with the rendered overpass to a user terminal 130. The transmitting module 470 may further send instructions for displaying the 2D digital map with the rendered overpass on the user device. As shown in FIG. 13, the 3D overpass displays on the 2D map at an interface of the user terminal 130.

It should be noted that the descriptions above in relation to processing device 112 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. In some embodiments, the processing device 112 may include one or more other modules. For example, the processing device 112 may include a storage module to store data generated by the modules in the processing device 112. In some embodiments, any two of the modules may be combined as a single module, and any one of the modules may be divided into two or more units.

Figure 5:
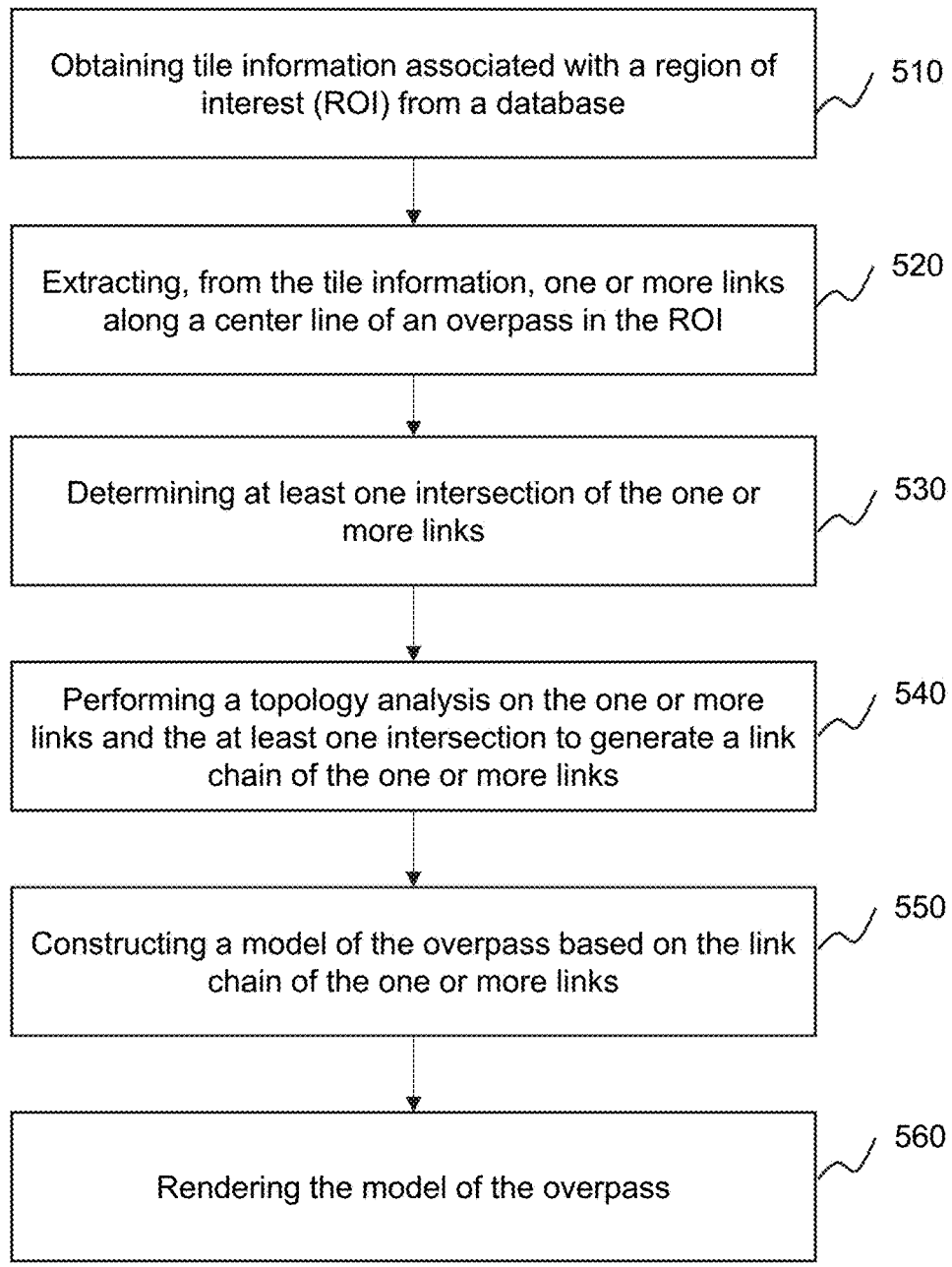
FIG. 5 is a flowchart illustrating an exemplary process for rendering an overpass according to some embodiments of the present disclosure.

FIG. 5 is a flowchart of an exemplary process for rendering an overpass according to some embodiments of the present disclosure according to some embodiments of the present disclosure. In some embodiments, the process 500 for rendering an overpass may be implemented in the map rendering system 100 as illustrated in FIG. 1. For example, the process 500 may be implemented in a user terminal 130 and/or the server 110. The process 500 may also be implemented as one or more instructions stored in the storage device 140 and called and/or executed by the processing device 112. The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processor (e.g., the tile acquisition module 410 of the processing device 112) may obtain tile information associated with a region of interest (ROI) from a database (e.g., the information source 150). The database may provide map data related to the ROI.

In some embodiments, the ROI may include a specific region from a request, for example, a building, a bridge, a road segment, a route connected a start location to an end location, an overpass connected to two sidewalks or road segments, or the like, or any combination thereof. The specific region may be described in text, electrical or magnetic signals, and graph. The processor may locate the region by a positioning device. The processor may response to the request for map services from the one or more user terminals 130, for example, a request for a map navigation for walking from position A to position B. The map server may plan a walking route in response to the request. In this occasion, the planned walking route may be designated as the ROI. In some embodiments, the planned walking route may include an overpass allowing for the user to across the road. The processor may parse data related to the request, and obtain the ROI included in the request.

In some embodiments, the map data may include road segment data, land cover data, building data, streetscape data, and so on. The road segment data may define road locations (e.g., latitude and/or longitude coordinates for the road) and road attributes (e.g., road name, speed limit, road width, number of lanes, road type, etc.). In some embodiments, the road segment data may include the locations of one or more junctions connecting another road segment. As used herein, one or more junction may be also referred to as one or more intersections. It should be noted that the road segment refers to the road allowing for motor vehicles, non-motor vehicles, pedestrian, or animals. For example, the road segment may include motor way, non-motor way, pedestrian overpass, and so on. The land cover data may define locations and/or attributes of the non-road land cover. The land cover may include water body (e.g., rivers, oceans, lakes, pools, etc.), administrative body (e.g., boundaries of states, countries, cities, parks, etc.), area designations (e.g., rural, urban, suburban, desert, mountain, forest, etc.), or the like, or any combination thereof. The building data may define locations of the buildings or data about the building. For example, the building data may include ground elevation data and surface elevation data. The building height may be determined based on the ground elevation data and the surface elevation data. In some embodiments, at least a portion of map data (e.g., the road segment data, or the building data) may be defined by coordinates, for example, (x, y, z), where x represents a latitude coordinate, y represents a longitude coordinate, z represent a height coordinate. The height coordinate may indicate the height from the ground elevation to the surface elevation of an object (e.g., the building, the overpass, etc.). A ground road and an overpass may be identified based on the height information. For example, a first height coordinate of the ground road is 0, a second height coordinate of the overpass is a, and a>0. In other words, the overpass has a specific height over the ground road. In some embodiments, the map data may include 2D map image data, 3D map image data. The 2D map image data may be used to construct a 2D digital map, and the 3D image data may be used to construct a 3D digital map. In some embodiments, the 2D map image data and the 3D map image data may be used to construct a combination of a 3D model and the 2D digital map.

In some embodiments, the map data, whether in two dimensions or three dimensions, may be used to generate one or more map tiles, which produce the visual map. The one or more map tiles at different levels of detail (or resolution) may be generated. The levels of detail may depend on zoom levels. For example, when the zoom level is 0, there may be one tile to be generated by the image data. While the zoom level is 1, there may be four tiles to be generated by the image data. For a low zoom level, the detail of map tile or map data may not be as high relative to the detail at a high zoom level. In some embodiments, the zoom level may be a default value by the map rendering system 100, such as, 0. While the zoom level may be adjusted according to different scenarios. For example, when a user requests for a high resolution map service, the zoom level may be adjusted higher in response to the request. Accordingly, more map tiles of the ROI associated with the request may be generated. In some embodiments, each of the one or more map tiles may have the same size, for example, 256 pixels×256 pixels. In some embodiments, the sizes of one portion of the one or more map tiles may be different from the sizes of another portion of the one or more map tiles. In some embodiments, the map tiles may include raster-based map tiles. In some embodiments, the map tiles may include vector-based map tiles. In some embodiments, the map tiles may include a combination of vector data and raster data.

In some embodiments, the map tiles may be stored in the information source 150. The map tiles may be accessed in response to the request. In some embodiments, each map tile may be assigned a unique identifier (or ID). The identifier may point to corresponding map tile. In some embodiments, the identifier may be indicated by a string, a symbol, a character, etc. The processor may identify the map tile information by indexing the identifier.

In 520, the processor (e.g., the link extraction module 420 of the processing device 112) may extract, form the tile information, one or more links along a center line of an overpass in the ROI.

In some embodiments, the processor may analyze the ROI, and determine whether there is an overpass in the ROI. When there is the overpass in the ROI, the processor may identify one or more tiles associated with the overpass. The processor may extract the one or more links along the center line of the overpass based on the one or more tiles. In the field of geography, a center line of a road surface or a pavement of an overpass may be abstracted as a link. The link corresponds to the road surface or the pavement. The link data may be included in the corresponding map tiles. In some embodiments, the link data may include locations of the link, types of the link, and/or a group-ID corresponding to the link. The locations of the link may include locations of two endpoints of the link, and/or a height from the ground evaluation. The types of the link may include a step link, a non-step link including an up link and/or a main span link. The step link indicates one or more steps (e.g., steps 1302 shown in FIG. 13) from the ground extends to the main span of the overpass (e.g., a main span 1306 shown in FIG. 13). The up link indicates an upward pavement from the ground extends to the main span, e.g., the upward pavement 1304 shown in FIG. 13. The main span link indicates the span pavement connected to two sidewalks (e.g., the main span 1306 shown in FIG. 13). The main span of the overpass is always higher than the ground. In some embodiments, the processor may render the one or more steps, the upward pavement, and/or the main span, according to the types of link. The group-ID corresponding to the link may refer to the unique identifier of the group which the link belongs to. In the process of producing map tiles with metadata, one or more links belong to a same road segment may be classified to a same group, and each group may be assigned a unique identifier. As used herein, the unique identifier of each group may be designated as the group-ID. Based on the group-ID, the processor may determine that the one or more links belong to one road. For example, the processing device 112 may identify the one or more links belong to an overpass based on the group-ID. The one or more links having the same group-ID belong to the same overpass.

In 530, the processor (e.g., the intersection determination module 430 of the processing device 112) may determine at least one intersection of the one or more links.

In some embodiments, when the end/start of a first link shares a location with the start of a second link, the shared location may be designated as the intersection. If there is at least one intersection between the one or more links, the one or more links may have at least one common attribute, for example, a name, a height, or a group-ID. The processor may determine the at least one intersection by identifying the at least one common attribute. As shown in FIG. 6, link 1 and link 2 share a same start location, e.g., an intersection 602. In some embodiments, intersection data may be generated, which is dependent of link data. The intersection data may include but not limited to an intersection ID, coordinates, intersection angle between two adjacent links, and so on. The intersection data and the link data may be stored separately. For example, the intersection data may be stored in a first data file of a storage device, and the link data may be stored in a second data file of the storage device. The processor may obtain the intersection data and the link data respectively from the storage device 140 or the information source 150.

In some embodiments, the processor may not directly obtain a location relationship associated with at least two adjacent links and their intersections. For example, as shown in FIG. 6, the processing device 112 may obtain link data related to link 1, link 2, and link 3A, and intersection data related to the intersection 602 respectively, while the processing device 112 may not directly determine that the location relationship, e.g., a connection sequence (clockwise or counterclockwise), of link 1, link 2 and link 3A, although these links share a common intersection.

To solve above issue, in 540, the processor (e.g., the topology analysis module 440 of the processing device 112) may perform a topology analysis on the one or more links and the at least one intersection, to generate a link chain of the one or more links. The link chain (e.g., the link chain 600 as illustrated in FIG. 6) may indicate a spatial structure of an overpass, more particularly, a spatial relationship of the one or more links associated with the overpass, such as connectivity, inclusion, and adjacency. In geographic information system (GIS), topology may be considered a special type of spatial relationship. It is a spatial relationship that does not depend on the coordinate geometry of the shapes or geometries participating in the relationship.

In some embodiments, the link chain may include a network topology. The network may be denoted as a graph G=(N,E), where N stands for a set of k nodes $\{n_1, n_2, n_3 \ldots n_k\}$, E is a set of links among the nodes, and $\forall E \in N \times N$. Each node may be an intersection. A first link may intersect a second link at the node. The node may be the end point of either the first link or the second link. In some embodiments, the processor may generate a binary graph and/or a weighted network graph based on a set of link data and a set of intersection data. More particularly, the processor may generate an adjacency matrix A(G) to represent the binary graph and/or the weighted network graph. The adjacency matrix is a square matrix used to represent a finite graph. The elements of the matrix indicate whether pairs of vertices are adjacent or not in the graph. In the binary network, if node i and node j are connected, and a weight of that edge or link associated with them is $A_{ij}=1$. The weighted network may be generated by appending the weight value $A_{ij} \geq 1$ to the edge or link. For the weighted network, $$A_{ij} = \begin{cases} \geq 1, & \text{if node } i \text{ and } j \text{ are connected} \\ 0, & \text{else} \end{cases}.$$

In some embodiments, the processor may perform the topology analysis by using a commercial ArcGIS engine. For example, the processing device 112 may access the ArcGIS engine through an application program interface (API). The ArcGIS may invoke a topology analysis unit to generate the topology structure by using the link data and the intersection data. In some embodiments, the ArcGIS engine may be integrated to the map rendering system 100. In some embodiments, the ArcGIS engine may be an external source, or system separated from the map rendering system 100. For those skilled in the art, any suitable commercial device, system, or tool having a functional of the topology analysis may be applied or in connection with the map rendering system 100 to perform the topology analysis.

Referring to FIG. 6, FIG. 6 illustrates an exemplary link chain according to some embodiments of the present disclosure. The link chain 600 is the topology analysis result of an overpass generated by the topology analysis module 440. As illustrated in FIG. 6, the topology analysis module 440 may obtain a dataset including link 1, link 2, link 3A, link 3B, link 4, link 5, and link 6, and a dataset including one or more nodes/intersections 602. The topology analysis module 440 may generate the topological link chain 600 by using the obtained datasets. The link chain 600 may indicate the spatial relationship associated with the links and the intersections. For example, link 1, link 2 and link 3A connect to each other at the intersection 602 counterclockwise. It should be understood that the spatial relationship of the one or more links of the overpass may be determined accurately by using the topology analysis. It is fundamental for constructing an accurate overpass model to determine the spatial relationship of the overpass.

In 550, the processor (e.g., the model determination module 450 of the processing device 112) may construct a model of the overpass (also referred to as the overpass model) based on the link chain of the one or more links.

In some embodiments, the processor may construct one or more sub-models corresponding to a link type of the one or more links that have a same Group-ID. The one or more links having the same group-ID may belong to a same overpass. The types of the link may include a step link, a non-step link including an up link and/or a main span link. As illustrated in FIG. 6, the overpass indicated by the link chain 600 may include seven links, where link 3A and link 3B represent the main span, remaining links represent the upward pavements or steps. For each of the one or more links, the processor may construct the one or more sub-models including a flat board model and at least one side wall model. In some embodiments, the processor may thicken the link in a width direction perpendicular to a main axis of the link to construct the flat board model. The processor may extend the flat board model in a direction perpendicular to a surface of the flat board model according to a first preset parameter. The first preset parameter may be a suitable value, e.g., 0.5 cm, 1 cm etc. The processor may further construct the at least one side wall model on at least one side of the flat board model. In general, there are two side wall models and one flat board model, which correspond to each link. More descriptions of constructing the one or more sub-models may be found in the present disclosure (e.g., FIG. 7 and FIG. 8, the descriptions thereof).

In some embodiments, the processor may integrate the one or more sub-models to form a whole overpass model. More particularly, the processor may fuse the one or more sub-models according to a sequence of fusion. The processor may determine the sequence of fusion, for example, clockwise or counterclockwise. The processor may fuse each two of the one or more sub-models. During the fusion, the processor may determine coordinates of points on the two sub-models. The processor may determine at least one fusion point which two points of the two sub-models have the same coordinate at. The processor may connect the two sub-models at the at least one fusion point. In some embodiments, the processor may eliminate sections of the two sub-models beyond the at least one fusion point, if the one or two of the two sub-models are the at least one side wall models. More descriptions of the fusion may be found elsewhere in the present disclosure (e.g., FIG. 9, and the descriptions thereof).

In 560, the processor (e.g., the rendering module 460 of the processing device 112) may render the model of the overpass. As illustrated in FIG. 13, the overpass 1300 is rendered as a 3D model with one or more textures (e.g., shadows, steps, colors, etc.).

In some embodiments, the processor may generate a plurality of surface grids on a surface of the overpass model in a clockwise direction or anti-clockwise direction to from a circle. Each of the plurality of surface grids may include a triangle, a square, a rectangle, a regular or irregular polygon, or the like, or any combination thereof. In some embodiments, size of each surface grid may be equal. In some embodiments, sizes of at least a part of the plurality of grids may be equal. Parameters of the plurality of surface sizes (e.g., size, shape, texture, etc.) may be predetermined by the map rendering system 100. The processor may further render the plurality of surface grids. For example, the rendering module 460 may render each of sections of the model based on the type of links. The rendering module 460 may obtain texture data associated with each section of the model of the overpass. The texture data may include color, shadow, or therein area, or the like, or any combination thereof. In some embodiments, the rendering module 460 may use a shader to render the texture of each section of the model. For example, the flat board model of the main span may be rendered as a white color, the side wall model of the main span may be rendered as a pink color. As another example, the one or more steps corresponding to the step link may be rendered as black and white. In some embodiments, the rendering module 460 may render each of the plurality of surface grids to present a visual 3D model of the overpass.

In some embodiments, during modeling the plurality of surface grids on the overpass model, vertices of one or more surface grids of the plurality of surface grids may have incorrect positions. The vertices having incorrect positions may be repaired automatically or manually. For example, the processing device 112 may determine a vertex in one or more surface grids of the plurality of surface grids, which is higher or lower than other vertices on the one or more surface grids. The processing device 112 may further adjust a height of the vertex based on the heights of the other vertices in the one or more surface grids. After the adjustment, the vertex may be in a correct position.

In some embodiments, the processor may integrate the rendered overpass model into a 2D digital map associated with the ROI. For example, the processing device 112 may compress and encode the rendered model, and send the 2D digital map with the rendered overpass to a user terminal 130. The sent map data and model data may be in various forms, such as encoded electrical signals, graph, etc. Upon receipt of the sent 2D digital map with the rendered overpass, the user terminal 130 may display the 3D overpass on the 2D digital map. As shown in FIG. 13, the 3D overpass displayed on the 2D map, 1302 represents a rendered step model corresponding to the step link, 1304 represents a rendered upward pavement corresponding to the up link, 1306 represents a rendered main span corresponding to the main span link. It should be noted that, the rendered model may be stored in the storage device 140 of the map rendering system 100, and the user terminal 130 may directly display the rendered model upon receipt of the rendered model from the server 110. In some embodiments, because it may take huge amount of computations for rendering the model at a server side, the processing device 112 sends model data without rendering processing to the user terminal 130, the user terminal 130 may further render the model at the user terminal side.

It should be noted that the above description is merely provided for the purpose of illustration, and not intended to limit the scope of the present disclosure. For persons having ordinary skills in the art, multiple variations and modifications may be made under the teachings of the present disclosure. For example, operation 520 and operation 530 may be integrated to a single operation. However, those variations and modifications do not depart from the scope of the present disclosure.

Figure 7:
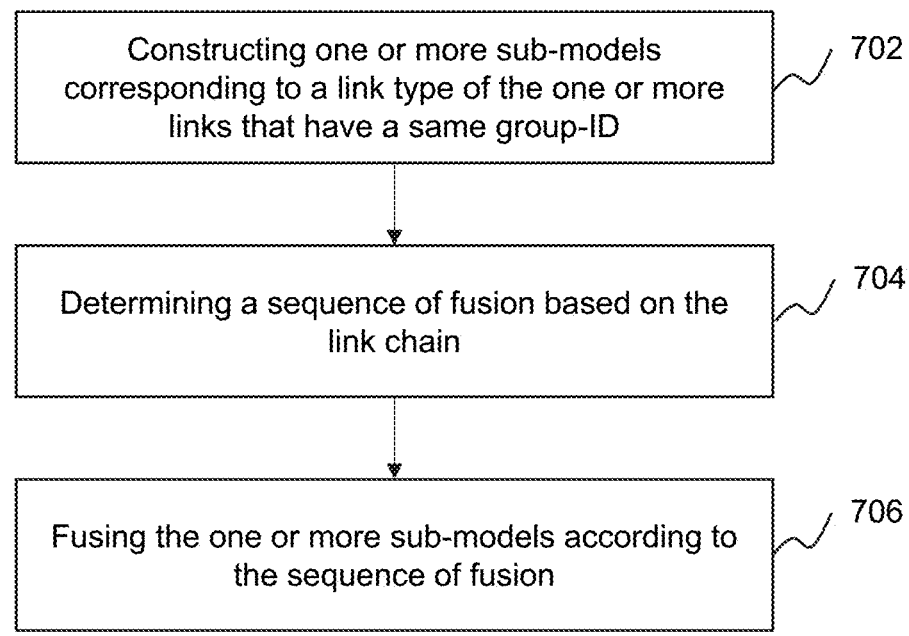
FIG. 7 is a flowchart illustrating an exemplary process for constructing a model of an overpass according to some embodiments of the present disclosure.

FIG. 7 is a flowchart of an exemplary process for constructing a model of an overpass according to some embodiments of the present disclosure. In some embodiments, the process 700 may be implemented in the map rendering system 100 as illustrated in FIG. 1. For example, the process 700 may be implemented in a user terminal 130 and/or the server 110. The process 700 may also be implemented as one or more instructions stored in the storage device 140 and called and/or executed by the processing device 112. The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 702, the processor (e.g., the model determining module 450 of the processing device 112) may construct one or more sub-models corresponding to a link type of the one or more links that have a same group-ID.

As used herein, the link type may include a step link and a non-step link. In some embodiments, the processor may construct the one or more sub-models corresponding to the step link or the non-step link. The one or more sub-models may include at least one side wall model and a flat board model. In some embodiments, the processor may construct the at least one side wall model and the flat board model for either the step link or the non-step link. By contrast with the non-step link, the processor may apply a plurality of steps to the flat model associated with the step link in the process of rendering. The side wall models and the flat models associated with the one or more links may be integrated to a whole model of the overpass. The side wall model indicates one side wall of the main span and/or upward pavement. The flat board model may indicate one flat board or a surface supporting pedestrians.

Figure 8:
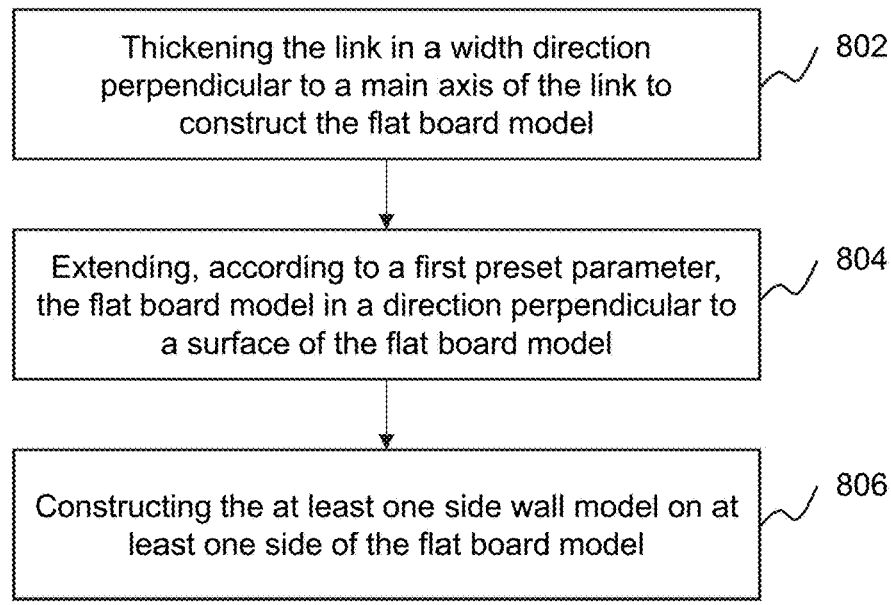
FIG. 8 is a flowchart illustrating an exemplary process for constructing a model of an overpass according to some embodiments of the present disclosure.
Figure 9A:
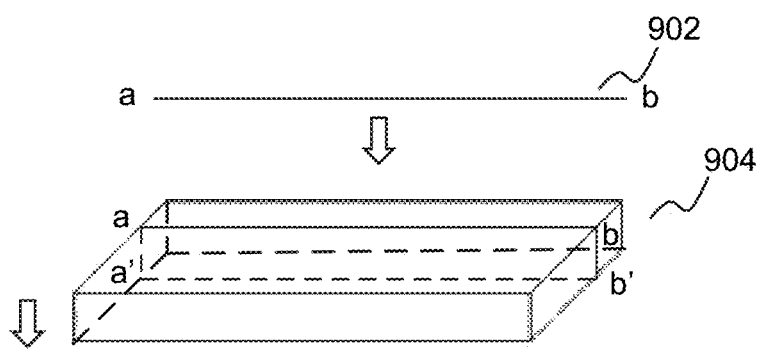
FIGS. 9A and 9B are schematic diagrams illustrating exemplary flat board model and side wall model of an overpass according to some embodiments of the present disclosure.
Figure 9B:
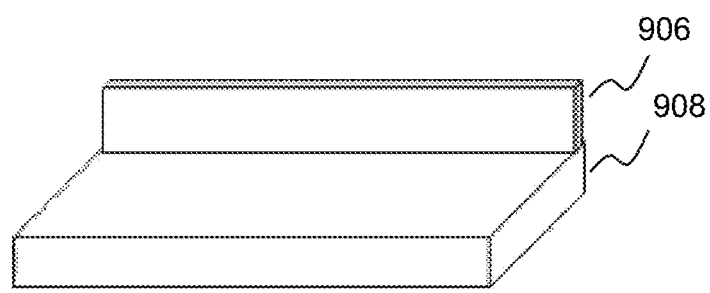

Referring to process 800 illustrated in FIG. 8, the processor may construct the sub-models associated with each of the one or more links. More particularly, in 802, the processor (e.g., the model determination module 450) may thicken the link in a width direction perpendicular to a main axis of the link to construct the flat board model. In other words, the operation 802 may indicate that a transformation of a line (e.g., the link) to a surface (e.g., a section of the model in the width direction). As shown in FIG. 9A, let the line 902 (i.e., ab) be the main axis of a link of the main span. Let the direction of arrow be the width direction. The width direction is perpendicular to the line 902. The processor may thicken the line 902 to generate a surface or section in the width direction. For example, the rectangle abb'a' is the surface or section transformed by the line ab. The thickness value in the width direction may be predetermined by the processor, such as 0.5 cm, etc.

In 804, the processor (e.g., the model determination module 450) may extend, according to a first preset parameter, the flat board model in a direction perpendicular to a surface of the flat board model. In other words, the operation 804 may indicate that a transformation of a surface to a body, or two-dimensional surface to three-dimensional body. The first preset parameter may be determined by the processing device 112, and any suitable first preset parameter may be applied to the extension of the flat board model. In some embodiments, the first preset parameter may include a direction of extension, or a width of extension, and so on. For example, the model determination module 450 may extend the flat board model in two opposite directions perpendicular to the surface abb'a' of the flat board model respectively. The model determination module 450 may construct an entire flat board model 904 by the extension.

In 806, the processor (e.g., the model determination module 450) may further construct the at least one side wall model associated with at least one side of the flat board model. According to the structure of overpass, there are always two side walls or handrails on a top surface of the flat board model associated with the main span. The processor may construct a first side wall model at a first side of the flat board model, a second side wall model at a second side of the flat board model. The side wall model may be a 3D body similar to the flat board model. As show in FIG. 9B, the first side wall model 904 is at the first side of the flat board model 904. In some embodiments, sizes of the side wall model may be predetermined by the processing device 112, including length×width×height.

In 704, the processor (e.g., the model determination module 450 of the processing device 112) may determine a sequence of fusion based on the link chain. In some embodiments, the sequence of fusion may include a clockwise, or a counterclockwise. For example, referring back to FIG. 6, the link chain 600 shows a correct spatial relationship of the structure of the overpass, the model determination module 450 may determine a counterclockwise direction as the sequence of fusion. That is, the model determination 450 may firstly fuse link 1, link 2 and link 3A, secondly fuse link 3A, link 4 and link 3B, thirdly fuse link 3B, link 5 and link 6. In some embodiments, the sequence of fusion may be a default setting of the map rendering system 100, such as the counterclockwise. In some embodiments, the sequence of fusion may be customized according to a requirement of the map rendering system 100. For example, an operator of the map rendering system 100 may specify a particular sequence of fusion, which indicates fusion sequence for each link of the link chain.

In 706, the processor (e.g., the model determination module 450 of the processing device 120) may fuse the one or more sub-models according to the sequence of fusion.

Figure 10:
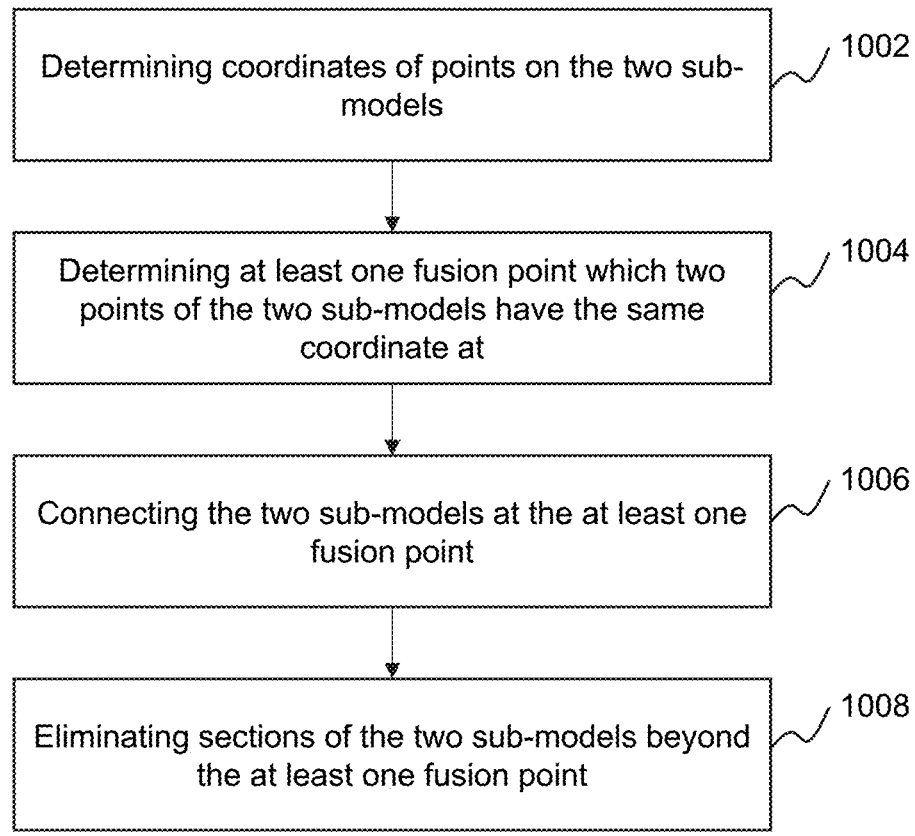
FIG. 10 is a flowchart illustrating an exemplary process for fusing one or more sub-models according to some embodiments of the present disclosure.

Referring to process 1000 illustrated in FIG. 10, the processor may fuse the one or more sub-models. More particularly, for each two of the one or more sub-models, the processor may determine coordinates of points on the two sub-models, as illustrated in 1002. The coordinates of points may be represented by a 2D coordinates, for example, (x,y), or a 3D coordinates, for example, (x, y, z). In some embodiments, the points on the sub-models may be samples of edges of the sub-models. The sub-models may include side wall models (e.g., the side wall model 906) and flat board models (e.g., the flat board model 908). In some embodiments, the information regarding coordinates of points may be stored in the storage device 140. The processor may obtain the coordinates of points from the storage device 140.

In 1004, the processor may determine at least one fusion point which two points of the two sub-models have the same coordinate at. In other words, the points having same coordinates may be designated as the fusion point. In some occasions, the fusion points may occur at the border of two sub-models. As illustrated in FIG. 11A, FIG. 11A illustrates a top view of an overpass model, where 1110 represents a first side wall model associated with a up link, 1120 represents a second side wall model associated with a main span link. The model determination module 450 may designate an intersection of the first side wall model and the second side wall model as a fusion point. Similarly, the model determination module 450 may determine a plurality of fusion points for each two sub-models, such as the fusion points 1104-1108. In some embodiments, for each two adjacent link of the link chain of the overpass, the processor may determine two fusion points. For example, the model determination module 450 may determine two fusion points 1102 and 1104, associating with two first side wall models 1110 of the up link and the second side wall model 1120 of the main span link.

In 1006, the processor may further connect the two sub-models at the at least one fusion point. For example, the model determination module 450 may connect the first side wall model 1110 and the second side wall model 1120 at the fusion point, which aims at integrating the sub-models as a whole. Similarly, the processor may connect the sub-models at corresponding fusion points according to the sequence of fusion (e.g., a counterclockwise).

In 1106, the processor may eliminate sections of the two sub-models beyond the at least one fusion point. In some embodiments, due to the solid body of the sub-models, the side wall model of the main span link beyond the fusion point may block an entry to the main span. For example, as illustrated in FIG. 11A, during the modeling, if the section between the fusion point 1102 and 1104 is not eliminated, the section may block the entry to the main span. Therefore, the processor may need to eliminate the section, which aims at modeling a real overpass. In some embodiments, the processor may eliminate overlaps of each two sub-models. The overlaps may include the sections of the two sub-models beyond the fusion point.

In some embodiments, for further modeling an ideal overpass model, the processor may determine the main span link from the one or more links of the overpass, and extended sections of a sub-model of the main span link that are connected to sub-models of other of the one or more links. The extended sections may include landing platforms, for example, as illustrated in FIG. 11B, in the dotted circle, the rectangular section surrounded by four points. For example, the processing device 112 may determine the main span link by performing topology analysis for the one or more links of the overpass, e.g., the main link 3A or 3B shown in FIG. 6. The processor may construct a sub-model of the main span link, e.g., the flat board model of main span link, as described in FIG. 8. The flat board model may be modeled as a cubic structure. In some embodiments, for the overpass, there is at least one landing platform connected to the upward pavement and the main span. The at least one landing platform may be used to smooth the junctions between the upward pavement and the main span. During the construction of the model of overpass, the processor may extend the sections of the flat board model of the main link, which connects to at least one flat board model of up links.

Referring to FIG. 11B, FIG. 11B illustrates a top view of an overpass model. As illustrated in FIG. 11B, 1130 represents a flat board model of the main span link, 1140 represents a flat board model of the up link, S1 represents a first width of a first surface of the flat board model, S2 represents a second width of the first surface of the flat board model. In some embodiments, the process may extend the section connected to the flat board model 1130 of the main span link that is connected to the flat board model 1140 of the up link, the extended section indicating the landing platform of the overpass. As shown in FIG. 11B, the end section of the first surface of the flat board model 1130, e.g., the rectangular section surrounded by four points in the dotted circle, is wider than the middle section of the first surface, that is, S2>S1. The end section indicates the extended section. Similarly, the processor may construct the extended sections at the junction of the main span link and the up link.

It should be noted that the above description is merely provided for the purpose of illustration, and not intended to limit the scope of the present disclosure. For persons having ordinary skills in the art, multiple variations and modifications may be made under the teachings of the present disclosure. For example, operation 704 and operation 706 may be integrated to a single operation. However, those variations and modifications do not depart from the scope of the present disclosure.

Figure 12:
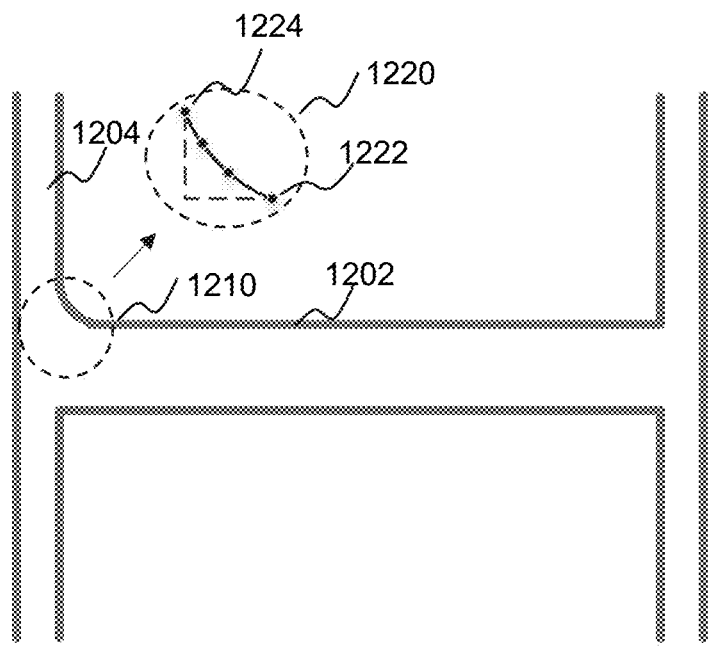
FIG. 12 is a schematic diagram illustrating a curve for smoothing an edge of an overpass model according to some embodiments of the present disclosure.

In some embodiments, the processor (e.g., the processing device 112) may smooth for one or more edges of the overpass model to create more realistic rendered overpass. In some embodiments, the smoothing may include a round-center processing, which allows to modify a right-angle of the edge as a rounded center. More particularly, the processing device 112 may determine an edge on the overpass model. The edge is bounded by a first surface and a second surface of the overpass model (e.g., the first surface 1202, the second surface 1204, as illustrated in FIG. 12). The processing device 112 may determine a curve corresponding to the edge from a first point on the first surface to a second point on the second surface. For example, the processing device 112 may determine the curve by using bezier interpolation method. The processing device 112 may determine at least one point on the curve. In some embodiments, an arc distance of each two points on the curve may be equal and/or different. The processing device 112 may replace the edge by at least two segments sequentially connecting the first point on the first surface, the at least one point on the curve, and the second point on the second surface.

Referring to FIG. 12, FIG. 12 illustrates a top view of the model of the overpass including a smooth edge. As illustrated in FIG. 12, 1202 represents a first surface of a first side wall model associated with the main span link, 1204 represents a second surface of a second side wall model associated with the up link, dotted circle 1210 represents a smooth rounded center by replacing a right-angle, dotted circle 1220 represent a schematic diagram illustrating the round-center process. As illustrated in 1220, a curve between the first point 1222 on the first surface and the second point 1224 on the second surface may be determined. The processing device 112 determines other two points on the curve. The processing device 112 may connect the first point, the other two points, and the second point sequentially for constructing the rounded center.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
   a storage device including a set of instructions for displaying a rendered overpass on a 2D digital map; and
   at least one processor in communication with the storage device, wherein when executing the set of instructions, the at least one processor is configured to cause the system to:
   obtain tile information associated with a region of interest (ROI) from a database;
   extract, from the tile information, one or more links along a center line of an overpass in the ROI;
   determine at least one intersection of the one or more links;
   perform a topology analysis on the one or more links and the at least one intersection to generate a link chain of the one or more links;
   determine a sequence of fusion based on the link chain;
   construct a model of the overpass by fusing one or more sub-models according to the sequence of fusion, wherein the one or more sub-models correspond to a link type of the one or more links that have a same group-ID, the one or more sub-models comprise a flat board model and at least one side wall model, and to construct the flat board model and the at least one side wall model corresponding to the one or more links, the at least one processor is configured to cause the system to:
   for each of the one or more links,
   thicken the link in a width direction perpendicular to a main axis of the link to construct the flat board model;
   extend, according to a first preset parameter, the flat board model in a direction perpendicular to a surface of the flat board model; and
   construct the at least one side wall model on at least one side of the flat board model; and
   render the model of the overpass.

2. The system of claim 1, wherein to construct the model of the overpass by fusing the one or more sub-models according to the sequence of fusion, the at least one processor is configured to cause the system to:
   for each two of the one or more sub-models to be fused,
   determine coordinates of points on the two sub-models;
   determine at least one fusion point at which two points of the two sub-models have the same coordinate;
   connect the two sub-models at the at least one fusion point; and
   eliminate sections of the two sub-models beyond the at least one fusion point, if one or two of the two sub-models are the at least one side wall models.

3. The system of claim 1, wherein to construct the model of the overpass by fusing the one or more sub-models according to the sequence of fusion, the at least one processor is further configured to cause the system to:
   determine a main span link from the one or more links; and
   extend sections of a sub-model of the main span link that are connected to sub-models of other of the one or more links.

4. The system of claim 1, wherein the at least one processor is further configured to cause the system to:
   integrate the rendered model of the overpass into a 2D digital map associated with the ROI;
   transmit the 2D digital map with the rendered overpass to a user device; and
   display the 2D digital map with the rendered overpass on the user device.

5. The system of claim 1, wherein the at least one processor is further configured to cause the system to:
   determine an edge on the model of the overpass, wherein the edge is bounded by a first surface and a second surface of the model of the overpass;

determine a curve corresponding to the edge from a first
point on the first surface to a second point on the second
surface;
determine at least one point on the curve; and
replace the edge by at least two segments sequentially
connecting the first point on the first surface, the at least
one point on the curve, and the second point on the
second surface.

6. The system of claim 1, wherein to render the model of
the overpass, the at least one processor is configured to cause
the system to:
generate a plurality of surface grids on a surface of the
model of the overpass connecting the one or more links
in a clockwise direction or anti-clockwise direction to
form a circle; and
render the plurality of surface grids.

7. The system of claim 6, wherein the at least one
processor is configured to cause the system to:
determine a vertex in one or more surface grids of the
plurality of surface grids, wherein the vertex is higher
or lower than other vertices on the one or more surface
grids; and
adjust a height of the vertex based on the heights of the
other vertices in the one or more surface grids.

8. The system of claim 1, wherein the link type of the one
or more links comprises a step link and a non-step link, the
at least one processor is configured to cause the system to:
render each of sections of the model based on the link type
of the one or more links.

9. A method implemented on a computing device having
at least one processor and at least one computer-readable
storage medium, comprising:
obtaining tile information associated with a region of
interest (ROI) from a database;
extracting, from the tile information, one or more links
along a center line of an overpass in the ROI;
determining at least one intersection of the one or more
links;
performing a topology analysis on the one or more links
and the at least one intersection to generate a link chain
of the one or more links;
determining a sequence of fusion based on the link chain;
constructing a model of the overpass by fusing one or
more sub-models according to the sequence of fusion,
wherein the one or more sub-models correspond to a
link type of the one or more links that have a same
group-ID, the one or more sub-models comprise a flat
board model and at least one side wall model, and to
construct the flat board model and the at least one side
wall model corresponding to the one or more links, the
method further comprises:
for each of the one or more links,
thickening the link in a width direction perpendicular
to a main axis of the link to construct the flat board
model;
extending, according to a first preset parameter, the
flat board model in a direction perpendicular to a
surface of the flat board model; and
constructing the at least one side wall model on at
least one side of the flat board model; and
rendering the model of the overpass.

10. The method of claim 9, wherein the constructing a
model of the overpass by fusing one or more sub-models
according to the sequence of fusion further comprises:
for each two of the one or more sub-models to be fused,
determining coordinates of points on the two sub-
models;
determining at least one fusion point at which two
points of the two sub-models have the same coordi-
nate;
connecting the two sub-models at the at least one fusion
point; and
eliminating sections of the two sub-models beyond the
at least one fusion point, if one or two of the two
sub-models are the at least one side wall models.

11. The method of claim 9, wherein the constructing a
model of the overpass by fusing one or more sub-models
according to the sequence of fusion further comprises:
determining a main span link from the one or more links;
and
extending sections of a sub-model of the main span link
that are connected to sub-models of other of the one or
more links.

12. The method of claim 9, wherein the method further
comprises:
integrating the rendered model of the overpass into a 2D
digital map associated with the ROI;
transmitting the 2D digital map with the rendered over-
pass to a user device; and
displaying the 2D digital map with the rendered overpass
on the user device.

13. The method of claim 9, wherein the method further
comprises:
determining an edge on the model of the overpass,
wherein the edge is bounded by a first surface and a
second surface of the model of the overpass;
determining a curve corresponding to the edge from a first
point on the first surface to a second point on the second
surface;
determining at least one point on the curve; and
replacing the edge by at least two segments sequentially
connecting the first point on the first surface, the at least
one point on the curve, and the second point on the
second surface.

14. The method of claim 9, wherein the rendering the
model of the overpass further comprises:
generating a plurality of surface grids on a surface of the
model of the overpass connecting the one or more links
in a clockwise direction or anti-clockwise direction to
form a circle; and
rendering the plurality of surface grids.

15. The method of claim 14, wherein the method further
comprises:
determining a vertex in one or more surface grids of the
plurality of surface grids, wherein the vertex is higher
or lower than other vertices on the one or more surface
grids; and
adjusting a height of the vertex based on the heights of the
other vertices in the one or more surface grids.

16. The method of claim 9, wherein the link type of the
one or more links comprises a step link and a non-step link,
and the rendering the model of the overpass comprises:
rendering each of sections of the model based on the link
type of the one or more links.

17. A non-transitory computer readable medium, com-
prising at least one set of instructions, wherein when
executed by at least one processor of a computing device,
the at least one set of instructions causes the computing
device to perform a method, the method comprising:
obtaining tile information associated with a region of
interest (ROI) from a database;

extracting, from the tile information, one or more links along a center line of an overpass in the ROI;

determining at least one intersection of the one or more links;

performing a topology analysis on the one or more links and the at least one intersection to generate a link chain of the one or more links;

determining a sequence of fusion based on the link chain;

constructing a model of the overpass by fusing one or more sub-models according to the sequence of fusion, the one or more sub-models corresponding to a link type of the one or more links that have a same group-ID, the one or more sub-models comprise a flat board model and at least one side wall model, and to construct the flat board model and the at least one side wall model corresponding to the one or more links, the method further comprises:

for each of the one or more links,
thickening the link in a width direction perpendicular to a main axis of the link to construct the flat board model;
extending, according to a first preset parameter, the flat board model in a direction perpendicular to a surface of the flat board model; and
constructing the at least one side wall model on at least one side of the flat board model; and rendering the model of the overpass.

18. The non-transitory computer readable medium of claim 17, wherein the rendering the model of the overpass further comprises:

generating a plurality of surface grids on a surface of the model of the overpass connecting the one or more links in a clockwise direction or anti-clockwise direction to form a circle; and rendering the plurality of surface grids.

* * * * *